US008606687B2

(12) United States Patent
Co et al.

(10) Patent No.: US 8,606,687 B2
(45) Date of Patent: Dec. 10, 2013

(54) MODIFICATION OF MULTI-LATERALLY TRADED CONTRACTS BASED ON CURRENCY UNAVAILABILITY CONDITION

(75) Inventors: Richard Co, Chicago, IL (US); Steven Youngren, Elgin, IL (US); Lori Aldinger, Naperville, IL (US); John Labuszewski, Westmont, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 0 days.

(21) Appl. No.: 13/187,846

(22) Filed: Jul. 21, 2011

(65) Prior Publication Data

US 2013/0024346 A1  Jan. 24, 2013

(51) Int. Cl.
*G06Q 40/00* (2012.01)
(52) U.S. Cl.
USPC .................. 705/37; 705/1.1; 705/35
(58) Field of Classification Search
USPC .................................... 705/1.1, 35
See application file for complete search history.

(56) References Cited

U.S. PATENT DOCUMENTS

| 5,262,942 | A | 11/1993 | Earle |
| 5,978,485 | A | 11/1999 | Rosen |
| 6,188,993 | B1 | 2/2001 | Eng et al. |
| 6,856,969 | B1 | 2/2005 | Hache |
| 7,593,884 | B2 | 9/2009 | Rothman et al. |
| 7,783,539 | B2 | 8/2010 | Martin |
| 7,809,631 | B2 | 10/2010 | Bauerschmidt et al. |
| 7,818,229 | B2 | 10/2010 | Imrey et al. |
| 8,249,961 | B1 * | 8/2012 | Hopkins .................. 705/34 |
| 8,306,905 | B2 | 11/2012 | Brouwer |
| 2002/0010670 | A1 | 1/2002 | Mosler et al. |
| 2003/0023546 | A1 | 1/2003 | Shepherd |
| 2003/0033240 | A1 | 2/2003 | Balson et al. |
| 2003/0065594 | A1 | 4/2003 | Murphy |
| 2004/0006529 | A1 | 1/2004 | Fung |
| 2005/0154660 | A1 | 7/2005 | Sturm et al. |
| 2005/0192898 | A1 * | 9/2005 | Hache ............................ 705/40 |
| 2005/0262013 | A1 | 11/2005 | Guthner et al. |
| 2006/0224492 | A1 | 10/2006 | Pinkava |
| 2006/0224494 | A1 | 10/2006 | Pinkava |
| 2007/0061260 | A1 | 3/2007 | de Groeve et al. |
| 2007/0083459 | A1 | 4/2007 | Eubanks |
| 2007/0136180 | A1 | 6/2007 | Salomon et al. |
| 2007/0299775 | A1 * | 12/2007 | Algiene .................... 705/45 |
| 2008/0059365 | A1 | 3/2008 | Lee et al. |
| 2009/0234768 | A1 | 9/2009 | Van Slyke |
| 2009/0254471 | A1 | 10/2009 | Seidel et al. |
| 2010/0004999 | A1 | 1/2010 | DePetris et al. |
| 2010/0114756 | A1 | 5/2010 | Rodgers et al. |
| 2010/0185562 | A1 | 7/2010 | Nafeh |
| 2010/0223174 | A1 | 9/2010 | Thomas |
| 2010/0223178 | A1 * | 9/2010 | Schleicher .................. 705/37 |
| 2010/0312689 | A1 | 12/2010 | Bauerschmidt et al. |
| 2011/0125633 | A1 * | 5/2011 | Aaltonen et al. ........... 705/39 |
| 2013/0024340 | A1 | 1/2013 | Co et al. |
| 2013/0024345 | A1 | 1/2013 | Co et al. |
| 2013/0024347 | A1 | 1/2013 | Nyhoff et al. |

OTHER PUBLICATIONS

International Search Report and Written Opinion for PCT/US12/47309, mailed Sep. 20, 2012.
International Search Report and Written Opinion for PCT/US12/47317, mailed Sep. 27, 2012.
International Search Report and Written Opinion for PCT/US12/47322, mailed Oct. 1, 2012.
International Search Report and Written Opinion for PCT/US12/47336, mailed Sep. 27, 2012.
U.S. Patent Application filed Jul. 21, 2011, U.S. Appl. No. 13/285,525.
U.S. Patent Application filed Oct. 31, 2011, U.S. Appl. No. 13/285,502.

* cited by examiner

*Primary Examiner* — William Rankins
(74) *Attorney, Agent, or Firm* — Banner & Witcoff, Ltd.

(57) ABSTRACT

A type of multi-laterally traded contract may designate a primary currency and a secondary currency. The primary currency may be used for settlement and/or other payment obligations in connection with instances of the contract type. Under certain conditions, however, authorization may be given for settlement and/or payment of at least some obligations using an equivalent amount of the secondary currency.

20 Claims, 5 Drawing Sheets

MODIFICATION OF MULTI-LATERALLY TRADED CONTRACTS BASED ON CURRENCY UNAVAILABILITY CONDITION

CROSS-REFERENCE TO RELATED APPLICATION

This application is related to commonly-owned U.S. application Ser. No. 13/187,837, filed Jul. 21, 2011, entitled "Interest Accrual Provisions for Multi-Laterally Traded Contracts," and initially naming the same inventors, the disclosure of which is hereby incorporated by reference in its entirety.

BACKGROUND

The modern global economy employs numerous types of contracts that are traded and/or cleared in a multi-lateral environment. For example, participants in exchanges or other markets routinely buy, sell and otherwise utilize futures contracts and futures contract options. Futures contracts and options are commonly used in connection with various agricultural and industrial commodities, in connection with currency exchange, etc.

There are various circumstances under which a party to a typical futures contract might be obligated to make some sort of payment. As but one example, a clearinghouse may require mark-to-market payments on a periodic basis or when the current value of a futures contract is less than a certain percentage of a party's margin account with the clearinghouse. As another example, one party may purchase a contract from another party. Money is also typically paid when a futures contract is settled. That final payment may be based on the final mark of a cash settled contract. The final payment might alternatively be the amount of an invoice for satisfying delivery of a particular financial instrument, commodity, currency, etc.

These and other payments must typically be made in a currency that is specified by the futures contract. A market generally assumes that such payments will be unimpeded by illiquidity in a market for the specified currency, inconvertibility of the specified currency, non-transferability of the specified currency, or other scenarios in which the specified currency might not be readily available. Although exchange rates of various currencies relative to one another may fluctuate, conventional futures contracts typically contemplate an unrestricted availability of a specified currency on commercially reasonable terms.

If adequate supplies of a specified currency are not available, it may be difficult to settle or otherwise make payments in connection with a futures contract. In the context of over-the-counter derivatives traded and carried on a bilateral basis, parties have been known to reach various accommodations on a contract-by-contract basis. For example, two parties might agree that settlement could be made in an alternative manner (e.g., paying an equivalent amount of a foreign currency) and/or deferred until a later date. However, there are qualitative and quantitative differences between bilaterally-traded derivatives and derivatives traded on a multi-lateral basis. Although it is often simple for two parties to work out an accommodation of an unforeseen currency contingency, futures contracts must account for the needs of a potentially large number of market participants.

In particular, futures contracts are typically standardized so as to facilitate selling, offsetting, and otherwise creating a functioning market for a contract of a particular type (e.g., for a particular commodity or for a particular foreign currency). At any one time there may be a large number of outstanding futures contracts of a particular type. Each of those contracts may have very similar terms (e.g., deliver a specified amount of a particular commodity or a specified amount of a particular foreign currency), but may involve different parties. Moreover, various subsets of those contracts may mature at different dates. Even if the parties to each individual contract could agree on an appropriate way to accommodate an unforeseen currency condition, the accommodations would not be uniform across all of those contracts. This would be undesirable, as participants in futures contracts of a particular type should be treated fairly and consistently if a market for such contracts is to function properly.

In some cases, a commodity, futures or other type of exchange can take emergency action that modifies how all existing contracts of a particular type will be settled or otherwise performed. This is also undesirable. Such emergency actions invoke substantial governmental reporting requirements, can undercut market confidence, and can have other detrimental side effects.

SUMMARY

This Summary is provided to introduce a selection of concepts in a simplified form that are further described below in the Detailed Description. This Summary is not intended to identify key or essential features of the invention.

In at least some embodiments, a type of multi-laterally traded contract designates a primary currency and a secondary currency. The primary currency is used for settlement and/or other payment obligations in connection with instances of the contract type. Under certain conditions, however, authorization may be given for settlement and/or payment of at least some obligations using an equivalent amount of the secondary currency. For example, information regarding availability of the primary currency can be received. Based on that information, an unavailability condition can be found to exist with regard to the primary currency. In response to receipt of an indication of the unavailability condition, a notification can be transmitted. That notification may authorize obligors of individual contracts to pay at least some obligations with the secondary currency.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Figure 1:
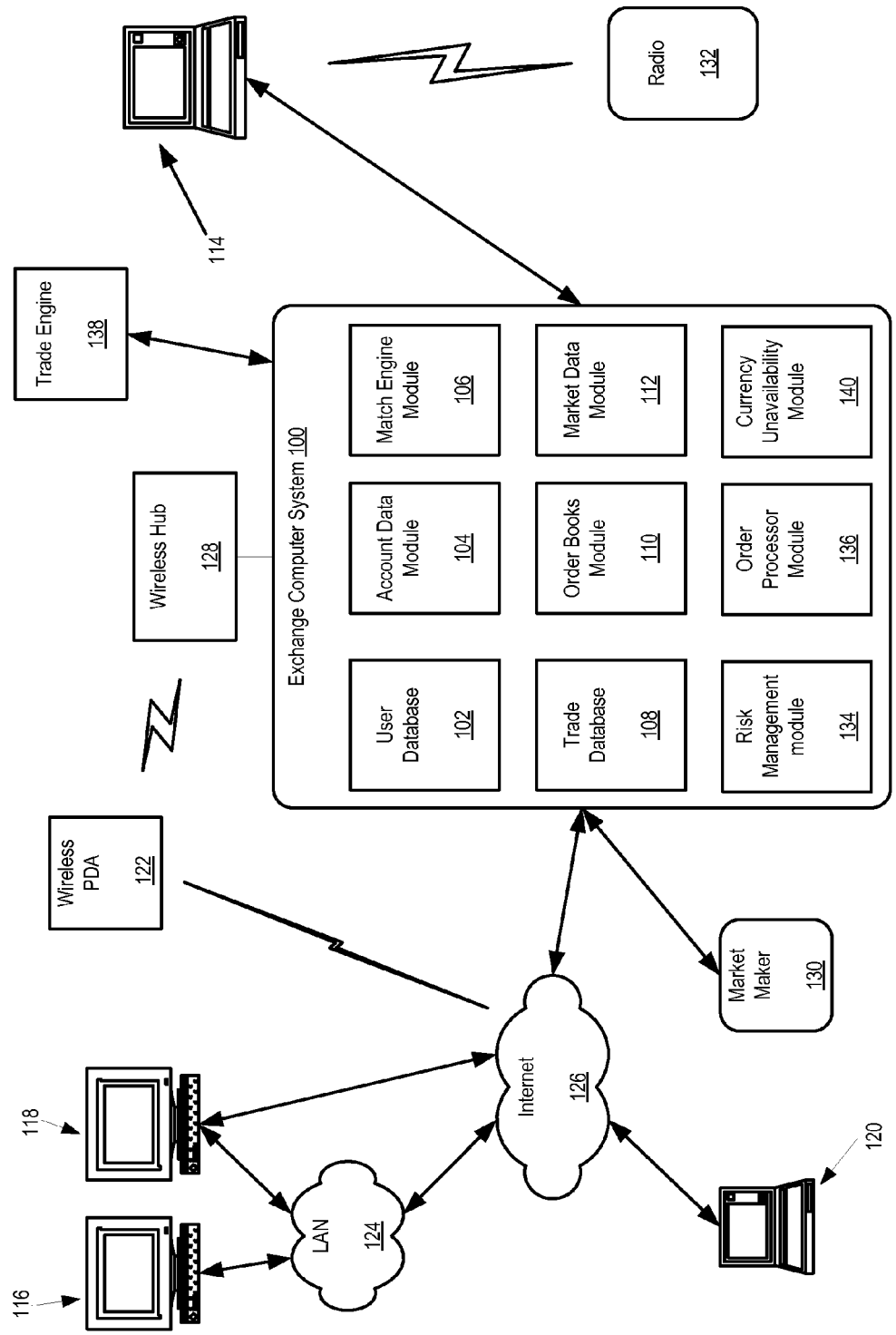
FIG. 1 shows a computer network system that may be used to implement aspects of the invention.

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a data processing system, and/or a computer program product. Accordingly, one or more aspects of one or more of such embodiments may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of tangible and/or non-transitory computer readable storage media such as hard disks, CD-ROMs, optical storage devices, magnetic storage devices, and/or any combination thereof.

Aspects of method steps described in connection with one or more embodiments may be executed on one or more processors associated with an exchange computer system 100 and/or associated with other computers or computer systems. Such processors may execute computer-executable instructions stored on non-transitory computer-readable media. Embodiments may also be practiced in distributed computing environments where tasks are performed by remote processing devices that are linked through a communications network. In a distributed computing environment, program modules may be located in both local and remote computer storage media including memory storage devices.

Exemplary Operating Environment

Aspects of at least some embodiments can be implemented with computer devices and computer networks that allow users to exchange trading information. An exemplary trading network environment for implementing trading systems and methods, including systems and methods that determine the existence of various currency unavailability conditions and take actions in response, is shown in FIG. 1.

An exchange computer system 100 receives orders and transmits market data related to orders and trades to users. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106. A currency unavailability module 140 may be included within exchange computer system 100 for determining whether certain conditions exist with regard to a currency designated for use in satisfying obligations under contracts of a particular type, and for taking appropriate action in those conditions. Those conditions and actions are discussed in more detail below.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer using a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium.

For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
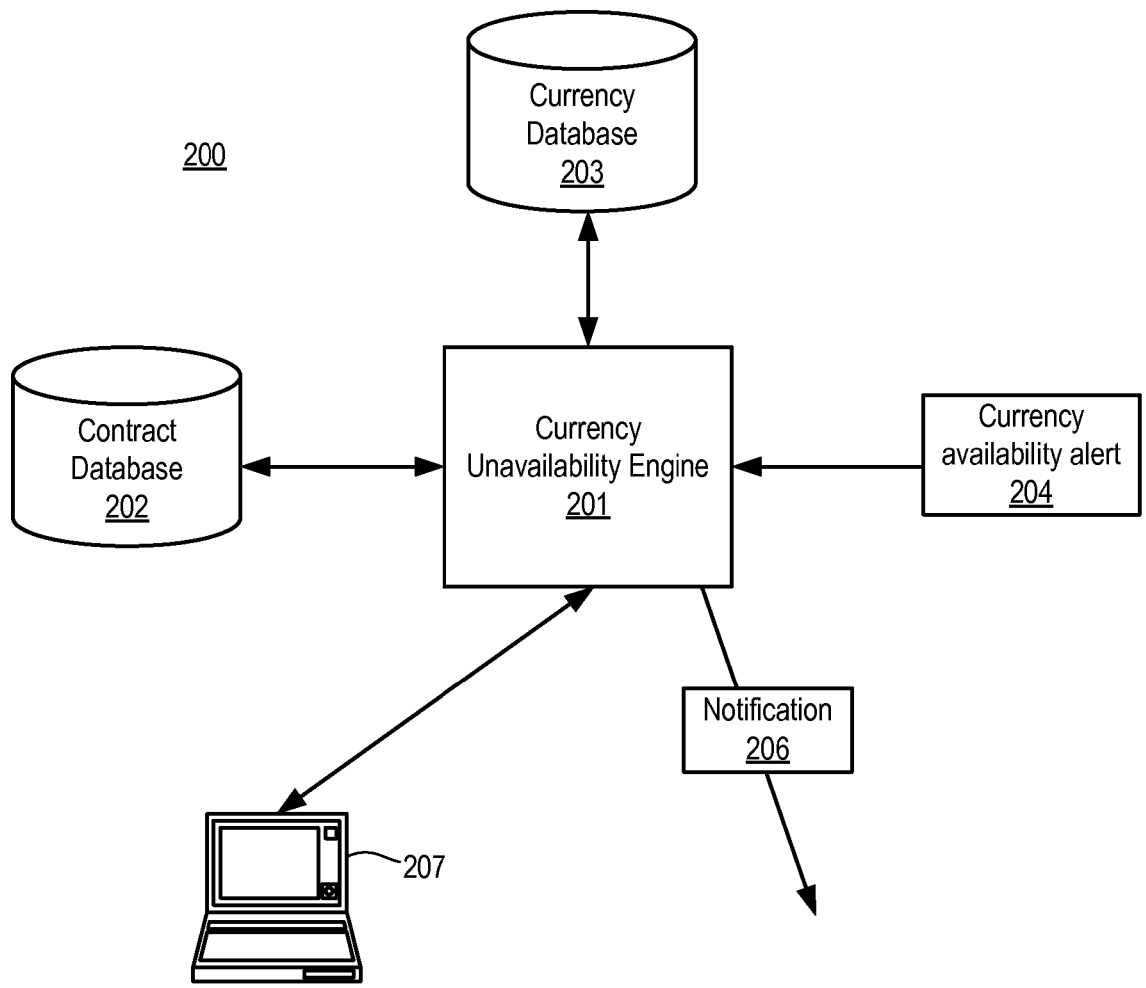
FIG. 2 is a block diagram of a system, according to some embodiments, for use in determining whether a currency unavailability condition exists.

FIG. 2 is a block diagram of a system 200, according to some embodiments, that is configured to determine whether one or more currency unavailability conditions exist and to take certain actions under such conditions. System 200 can be implemented as (or as part of) currency unavailability module 140 (FIG. 1), may be implemented as a standalone computer (or system of computers), or may be implemented as part of another system. Currency unavailability engine 201, which may be implemented in the form of one or more microprocessors executing program instructions, interfaces with one or more futures contracts databases 202. Database 202 maintains information regarding various types of futures contracts and options. For each of multiple futures contract and option types, that data may include designated primary and secondary currencies. A primary currency is a currency designated for use in satisfying obligations under contracts of a particular type. A secondary currency is designated for use in satisfying contract obligations if certain unavailability conditions are determined to exist.

Unavailability engine 201 receives various types of data from contracts database 202. As to each of at least some of the contract types for which information is maintained in database 202, engine 201 receives initialization data that includes general contract terms (e.g., commodity, currency or other contract subject matter, contract amount, delivery date, designated primary currency, designated secondary currency, etc.). Engine 201 also receives information that identifies the amount of contracts of a particular type that are outstanding. Engine 201 may receive updates from database 202 regarding outstanding contracts on a periodic or other basis. Database 202 may be implemented as a distributed database residing in one or more of the modules of exchange computer system 100 (FIG. 1), may be implemented as a one or more software routines configured to extract data from one or more of said modules, may be implemented as a standalone database accessible over the Internet or other wide area network, or may be implemented in other ways.

Currency unavailability engine 201 also interfaces with one or more currency databases 203. Database 203 stores information regarding the availability of various types of currencies. This information can be compiled using feeds (not shown) from various governmental and financial institutions regarding available quantities of various currencies, exchange rates of various currencies, short- and long-term historical data regarding availabilities and exchange rates for various currencies, etc. As with contract database 202, currency database 203 can be implemented in various ways.

Engine 201 may also receive alerts 204 that include data regarding availability of one or more types of currencies. Alerts 204 may come from any of multiple sources and may contain any of various types of information regarding potential unavailability of a particular currency. As but one example, an alert 204 could be a communication from a third party advising of difficulty in obtaining a particular currency. As another example, an alert 204 could be a communication from a bank or governmental entity advising of limits on currency availability or of changes in currency exchange rates. As a further example, an alert 204 could be automatically transmitted from database 203 based on information accumulated from multiple sources.

Engine 201 outputs notifications 206 that may authorize modification of the manner in which obligations under futures contracts are satisfied. As explained in more detail below, such notifications can include authorization for obligations under a contract of a particular type to be satisfied using the designated secondary currency and using a particular exchange rate for the secondary currency relative to the primary currency.

Engine 201 may also receive other types of input via one or more computers 207. For example, a human user of computer 207 may provide input to engine 201 that configures engine 201 to generate a particular output instruction 206. Such configuration can include specification of various parameters under which engine 201 may automatically determine that a particular currency unavailability condition has occurred. Such configuration could also include an authorization command. For example, engine 201 could be configured to provide a message to computer 207 based on certain criteria that suggest a particular currency may be unavailable. One or more human users of computer 207 could then review that message and any underlying data that caused the message to be sent. If the user(s) determine(s) that an unavailability condition has occurred with regard to the currency in question (e.g., that insufficient amounts of the currency are available, or are available but under generally uneconomic or otherwise onerous conditions per pre-specified criteria), the user(s) could then cause computer 207 to send a message to engine 201 that causes transmission of instruction 206. The message from computer 207 could include details of the manner in which obligations under contracts of a particular type (or types) may be satisfied in an alternative manner, as discussed below. Alert 204 could also be provided via or to computer 207. Computer 207 may be the same computer on which engine 201 executes and/or may also house one or more of databases 202 and 203. Alternatively, any or all of engine 201, database 202 and database 203 could execute or reside on computers separate from computer 207, with computer 207 communicating with those separate computers over one or more local and/or wide area networks.

Figure 3:
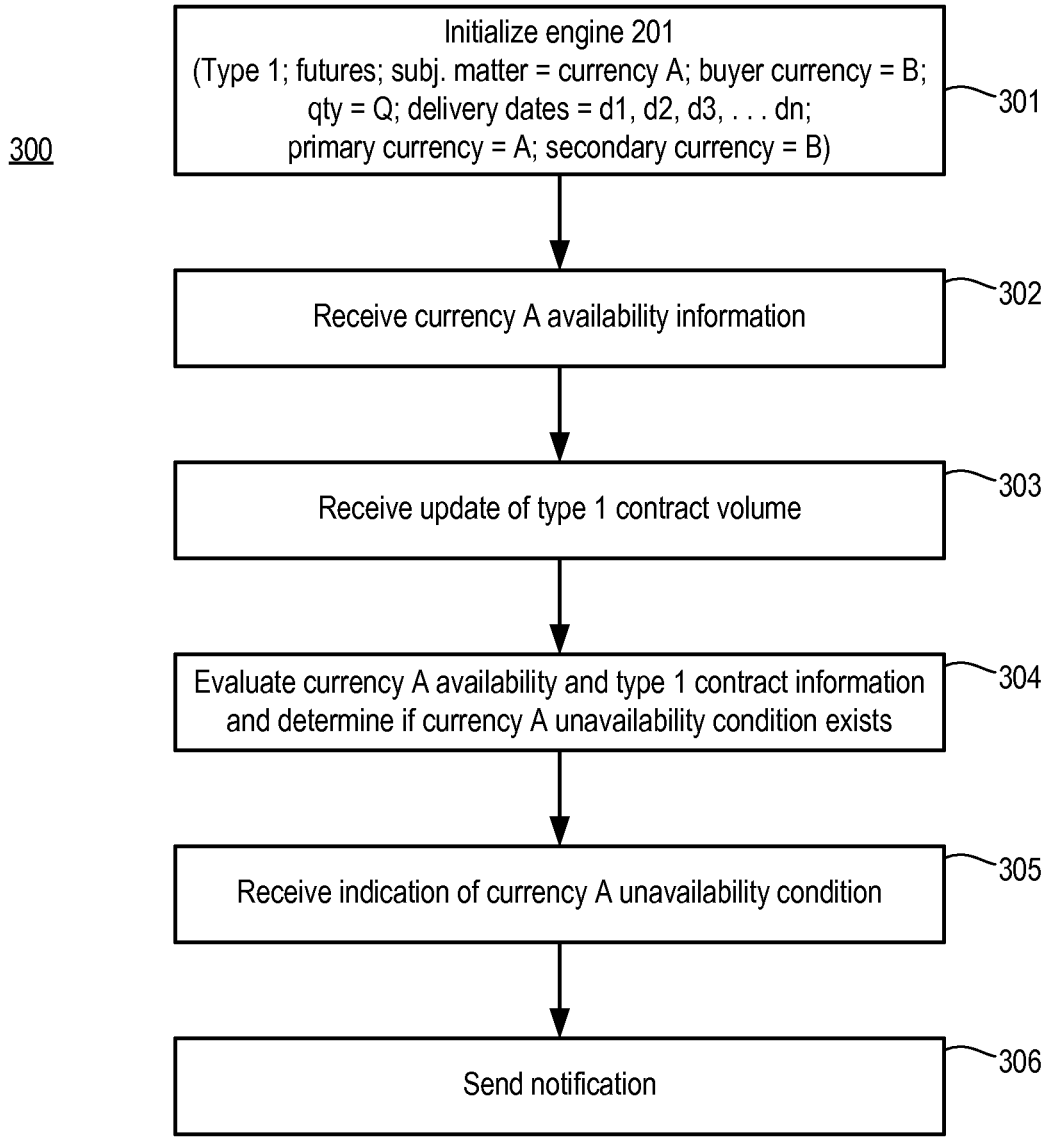
FIGS. 3 and 4 illustrate methods, according to some embodiments, in which a currency unavailability condition is found to exist and in which action is taken as a result.

FIG. 3 is a flow chart showing operations in a method 300 according to some embodiments and that can be performed using system 200. Method 300 is initially described using an example of a hypothetical currency exchange contract type. However, this is solely for purposes of illustration and is no way intended as a limitation on the types of multilaterally-traded contracts for which currency unavailability conditions may be detected and action taken in various embodiments.

In step 301, engine 201 is initialized with regard to a particular futures contract type ("type 1"). This initialization could occur automatically or in response to a human operator's command (e.g., a command from an operator of computer 207). In the present example, a type 1 contract is a futures contract having currency A as the subject matter, a designated quantity (Q) of which is delivered in return for payment of currency B. In other words, each instance of a type 1 contract will obligate a seller to deliver the specified quantity Q of currency A at a specified delivery date for an agreed amount of currency B to be paid by a buyer. The contract size (quantity Q of currency A to be delivered) may be standard for all type 1 contracts. There may be a limited number of possible delivery dates d1 through dn. For example, all type 1 contracts may specify delivery on the 3rd Wednesday of a month, and the longest allowed term of a type 1 contract may be n−1 months. Because the contract price (i.e., the amount of currency B to be paid for the standardized quantity of currency A) may be negotiated between the buyer and seller for each individual instance of a type 1 contract, the contract price may not be part of the initialization information. However, such information might be received in step 303 as part of updates regarding values of type 1 contracts.

The initialization data for type 1 contracts also designates a primary currency and a secondary currency. In the present example, the primary currency is currency A and the secondary currency is currency B. This need not be the case, however. As but one alternative, a contract type could designate a third currency (e.g., currency C) as the secondary currency.

In step 302, engine 201 receives information regarding availability of currency A. This information may be received from database 202, from one or more alerts 204, and/or from other sources. The availability information may provide an estimate of the quantity of currency A available on the world, or in a specified local, market, the current exchange rates for and amount of currency A available from each of multiple sources, interest rates for borrowing currency A, forecasts of availability and/or exchange rates for currency A in upcoming time periods, etc. As with step 301, step 302 could occur automatically or in response to a command resulting from input by a human operator into computer 207. For example, an operator of computer 207 may receive one or more indications from separate sources of potential unavailability or recent exchange rate spikes with regard to currency A. Based on such indications, the operator of computer 207 could provide input causing engine 201 to retrieve currency A information from database 203.

In step 303, engine 201 receives an update from database 202 indicating the volume of type 1 contracts outstanding. For example, this update may indicate the total number of outstanding type 1 contracts scheduled for delivery on each of the next delivery dates throughout the next N months, where N is the longest term type 1 contract available. As indicated above, the update could also include information regarding values of outstanding type 1 contracts, e.g., the contracted amount in each contract that the buyer has agreed to pay for the quantity Q of currency A.

As with steps 301 and 302, updating of engine 201 in step 303 could occur in response to a command resulting from input by a human operator into computer 207. Step 303 could also occur automatically. As one example, engine 201 could be configured to automatically retrieve information regarding outstanding type 1 contracts if there are certain triggers in the currency A data received in step 302. Such triggers could include information indicating events consistent with unavailability of currency A, e.g., receipt of an alert 204 (or receipt of a predetermined number of alerts 204), a rise of the average currency A exchange rate by more than a predetermined percentage of its current value or by more than some other amount, a drop in the estimated worldwide supply of currency A below a certain level, an increase in currency A lending rates beyond a particular level or amount, a news report regarding events in the country issuing currency A, etc. As another example, engine 201 could be configured to periodically download updates from information database 202 regardless of whether there are triggers in the data received in step 302.

In step 304, the information regarding currency A and regarding type 1 contracts is evaluated. Based on that evaluation, a determination is made regarding whether an unavailability condition has occurred with regard to currency A. This determination could be made automatically by engine 201. For example, engine 201 could be configured to compare an estimated amount of currency A available on the world market with the volume of type 1 contracts that will become due in the next month (or in the next several months). If the estimated supply of currency A is less than a predefined multiple of the type 1 contract volume, an unavailability condition could be deemed to occur. As another alternative, an average current exchange rate for currency A could be compared to exchange rates in preceding periods. If the current average exchange rate exceeds a value calculated from one or more previous period exchange rates by a certain amount, an unavailability condition could be declared.

Step 304 could also include a human decision regarding whether an unavailability condition for currency A has occurred. This decision could be based on objective or subjective criteria. As part of this decision process, information regarding type 1 contracts and currency A availability that was received at engine 201 is also received at computer 207. As engine 201 receives information during steps 301-303 in some embodiments, for example, engine 201 may forward that information to computer 207. That forwarded information can then be output by computer 207 and used by one or more persons to determine if an unavailability condition exists.

In some embodiments, engine 201 may automatically receive (or retrieve) information in steps 301-303, but only send that information to computer 207 under certain circumstances. For example, engine 201 could be configured to transmit a message to computer 207 in response to, and alerting a computer 207 user of, certain events that are consistent with unavailability of currency A. Such events could include receipt of an alert 204 (or receipt of a predetermined number of alerts 204), a rise of the average currency A exchange rate above some level, a drop in the estimated worldwide supply of currency A below a certain level, an increase in currency A lending rates beyond a particular level or amount, a news report regarding events in the country issuing currency A, etc.

If it is determined in step 304 that a currency A unavailability condition does not exist, the method could conclude. In the example of FIG. 3, however, a currency A unavailability condition is found to exist. Accordingly, in step 305 engine 201 receives an indication of that currency A unavailability condition. If the determination of step 304 was made automatically within engine 201, the indication could be the output of that automatic determination. If the determination in step 304 was made by a human, the indication could be a signal received from computer 207, which signal may be sent as a result of computer 207 receiving an indication from a human user that an unavailablity condition exists.

In step 306, engine 201 sends notification 206 to one or more of the elements of exchange computer system 100 and/or otherwise disseminates notification 206 to market participants. The content of notification 206 can be preconfigured or could be determined in some other manner. For example, an operator of computer 207 could provide some or all of the notice 206 content when providing an indication of the currency A unavailability condition to engine 201 in step 305.

The content of notification 206 can vary. Notification 206 could include an instruction that, until further notice, all type 1 contracts may or must be settled using an amount of currency B equivalent to the contract size (quantity Q in the present example) of currency A, and may further include an exchange rate to be used in calculating that equivalent amount of currency B. Notification 206 might also indicate that other payments associated with type 1 contracts could be made using equivalent amounts of currency B. In some cases, e.g., if the currency A unavailability condition is believed to be short-term, notification 206 might only authorize currency B equivalency payments for type 1 contracts that mature (e.g., that have delivery dates) in the next period or in the next few periods.

In some cases, it might be determined in step 304 that a currency A unavailability condition has occurred, but that there is a sufficient supply of currency A to permit some type 1 contract settlements and/or payments to be made using currency A. Accordingly, notification A could further include information indicating a portion of type 1 contract payments for which currency A is to be used and a portion of type 1 contract payments for which an equivalent amount of currency B is to be used. An allocation between currency A payments and currency B equivalency payments could be implemented in multiple ways. For example, and as indicated above, currency B equivalency payments might only be authorized for older type 1 contracts with near-term delivery dates. As another example, currency B equivalency payments might only be authorized for a randomly selected subset of all type 1 contracts. As yet another example, currency B equivalency payments might only be authorized for a portion of payments due under each type 1 contract (e.g., require each type 1 contract to be settled 50% by currency A delivery and 50% by currency B equivalency payments). As but another example, currency B equivalency payments might only be authorized for parties holding more than a certain amount of type 1 contracts.

For simplicity, embodiments have thus far been described using an example of a single type of futures contract. Other embodiments may operate in connection with more generalized and more complicated circumstances. Instead of a single type of futures contract for currency A, there could be multiple additional types: a type 2 contract requiring delivery of currency A for payment of currency C, a type 3 contract requiring delivery of currency A for payment of currency D, etc. There could also be numerous other types of contracts that designate currency A as a primary currency, but which require delivery of a commodity other than currency A (e.g., a futures contract for an agricultural or industrial commodity that requires cash settlement in currency A). There might also be various options for any of the futures contract types that designate currency A as a primary currency. And of course, all of these other contract and option types might exist in a market where there are a large number of futures contract types that do not designate currency A as primary (and/or that may not implicate currency A in any way).

Figure 4:
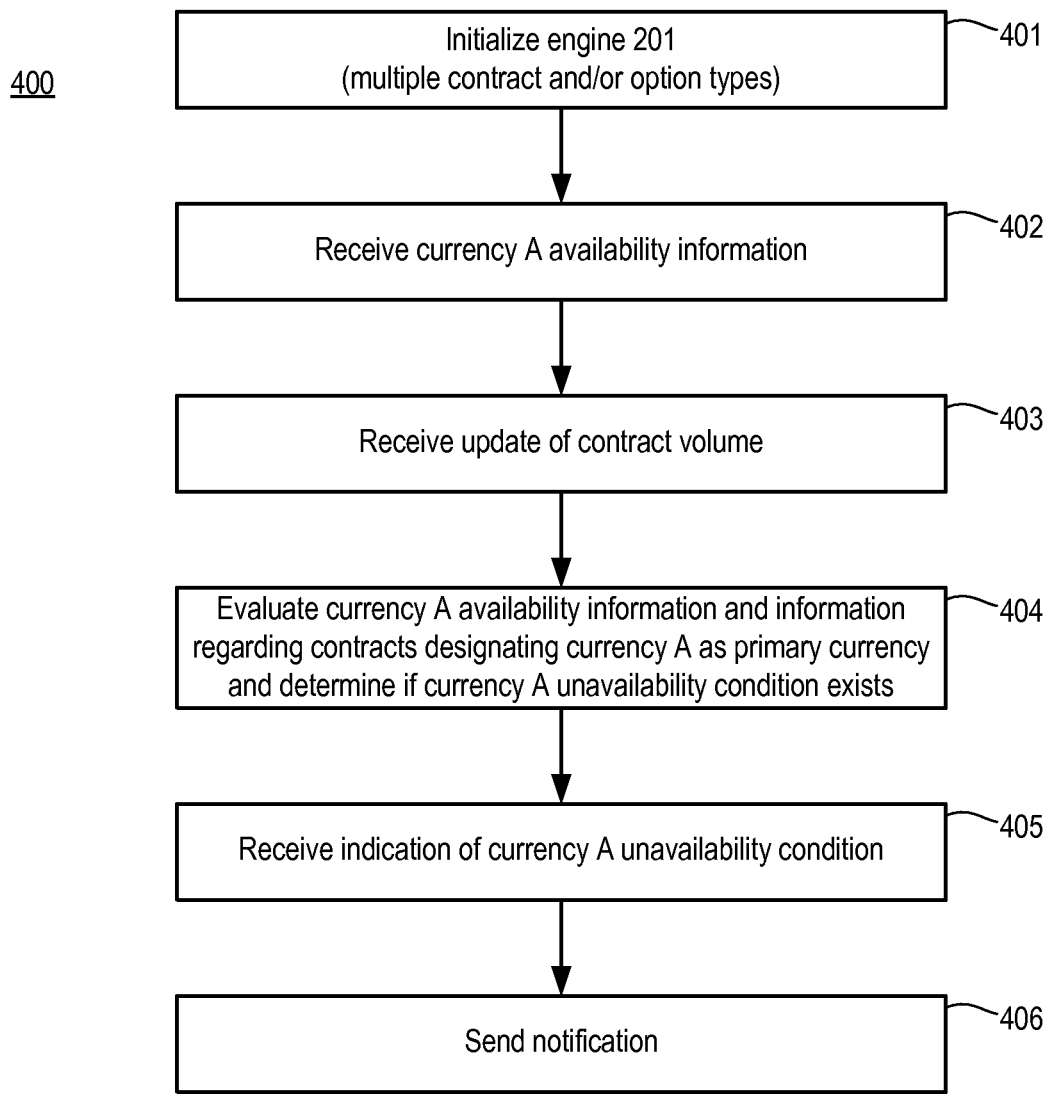

FIG. 4 is a flow chart showing operations in a method 400 according to some embodiments. Method 400 can also be performed using system 200 and is similar to method 300 of FIG. 3. However, method 400 assumes the existence of numerous types of contracts and options that designate currency A as the primary currency, as well as numerous other types of contracts and options that do not designate (and/or do not implicate) currency A.

In step 401, engine 201 is initialized with regard to, and provided with data regarding, the multiple types contracts and options that designate currency A as a primary currency. Although many of those contract types also designate a secondary currency, some may designate currency B as secondary, some may designate currency C as secondary, some may designate currency D as secondary, etc. In step 1, engine 201 is also initialized with regard to (and provided data regarding) numerous other types of contracts and options that do not implicate currency A.

In step 402, engine 201 receives information regarding availability of currency A. During step 402, however, engine 201 might also receive information regarding other currencies. Engine 201 could receive information in step 402 any of the ways described in connection with step 302 of FIG. 3.

In step 403, engine 201 receives one or more updates from database 202 indicating the volume of all types of contracts and options for which currency A is designated as the primary currency. During step 403, however, engine 201 might also receive one or more updates from database 202 indicating the volume for types of contracts and options that do not implicate currency A. Engine 201 could receive updates in step 403 any of the ways described in connection with step 303 of FIG. 3.

In step 404, the information regarding currency A and the information regarding all contracts and options that designate currency A as primary currency contracts is evaluated. Based on that evaluation, a determination is made regarding whether an unavailability condition has occurred with regard to currency A. This determination can be made automatically by engine 201 or with human involvement in ways similar to those described in connection with step 304 of FIG. 3.

In the example of FIG. 4, a currency A unavailability condition is found to exist. Accordingly, in step 405 engine 201 receives an indication of that currency A unavailability condition. This indication can be received in ways similar to those described in connection with step 305 of FIG. 3.

In step 406, engine 201 sends notification 206 to one or more of the elements of exchange computer system 100 and/or otherwise disseminates notification 206 to market participants. The content of notification 206, which can be set in ways similar to those discussed in connection with FIG. 3, can also vary in ways similar to those described in connection with FIG. 3. For example, notification 206 could include an instruction that, until further notice, all contracts designating currency A as the primary currency may be settled (and/or other obligations under such contracts paid) using an amount of the designated secondary currency equivalent to the contract amount, and may further include exchange rates to be used in calculating equivalent amounts of the secondary currencies. As another example, notification 206 might only authorize secondary currency equivalency payments for contracts that designate currency A as the primary currency and that mature in the next period or in the next few periods. Any of the currency A/currency B allocation techniques previously described could also be used to allocate between currency A payments and payment in an equivalent amount of a designated secondary currency.

Figure 5:
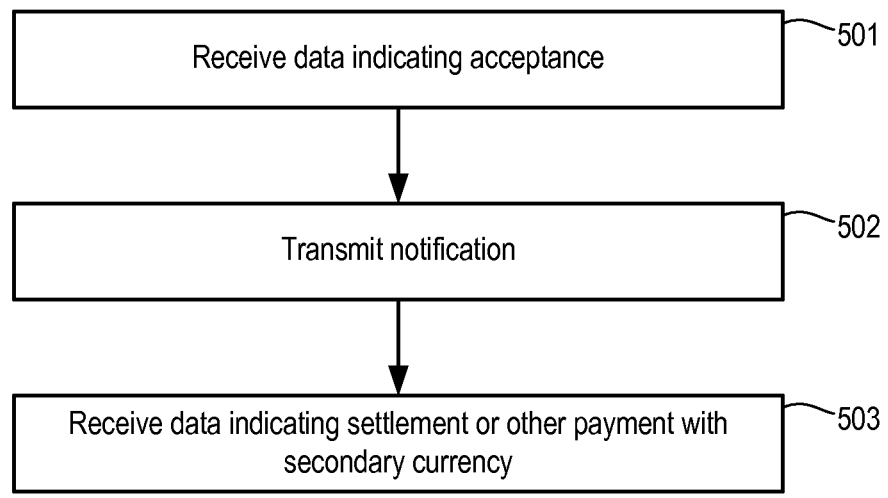
FIG. 5 illustrates a method, according to some embodiments, that may be performed in connection with a futures contract or other multi-laterally traded and/or cleared contract that designates primary and secondary currencies.

FIG. 5 is a flow chart showing steps that may be performed in connection with a futures contract or other multi-laterally traded and/or cleared contract that designates primary and secondary currencies. The steps shown in FIG. 5 could be performed in the system of FIG. 1 as operations resulting from execution of computer-readable instructions. Beginning in step 501, exchange computer system 100 receives data indicating acceptance of an offer (or bid) for a futures contract that designates primary and secondary currencies. At a later date, and as shown in step 502, a notification authorizing settlement or other payment in an equivalent amount of the designated secondary currency is transmitted. In step 503, data regarding the contract is received, which data indicates that settlement or other payment has been made with an equivalent amount of the secondary currency instead of with the primary currency.

As another more specific example, futures contracts could designate Chinese renminbi or yuan (RMB or CNY) as the primary currency and the U.S. dollar (USD) as the secondary currency. Historically, RMB (or CNY) has not been freely convertible to other currencies. In response to the increasing global economic significance of the People's Republic of China, however, the People's Bank of China (PBC) has taken steps to liberalize use of RMB in offshore locations such as Hong Kong. An offshore market in RMB, known as the CNH market, is rapidly growing. The PBC has also announced intentions to allow U.S. entities to transact in RMB. Currently, futures in RMB are quoted in "American terms," or USD per RMB. However, new types of RMB futures contracts could be quoted in "European terms," or RMB per USD. These new contracts could be cash-settled at the RMB per USD fixing rate published by PBC at 9:15 a.m. (Beijing time) and currently published by Reuters SAEC page opposite "USDCNY=". Although these new contracts could employ a cash settlement, the contracts could alternately provide for a physical delivery of RMB vs. USD, facilitated through an exchange-designated settlement bank.

Currently, however, offshore CNH is not fully convertible with onshore RMB. Accordingly, these new contract types could, similar to contract types discussed in connection with description of other embodiments, utilize procedures in the event that RMB is not available to support RMB-denominated daily mark-to-market payments, RMB-denominated final mark-to-market payments for cash-settled contracts, or physical delivery of RMB. If circumstances are such that one or more clearing members of an exchange is required to make RMB-denominated payments but is unable to do so because of circumstances beyond that member's control, the exchange may authorize satisfaction of such required payments in USD. The amount of USD to be paid could be determined by the amount of RMB due converted into USD by reference to a current RMB per USD rate. The exchange could have sole discretion to authorize payment in USD instead of RMB under circumstances that could include illiquidity in the offshore RMB market, inconvertibility of RMB, non-transferability of RMB, etc. One of these new type contracts could include a "standard" sized futures contract (or an option on futures) nominally based on USD 100,000 and quoted in minimum increments of 0.0010 RMB per USD=100 RMB. Another of these new type contracts could include a "micro" sized futures contract (or an option on futures) nominally based on USD 10,000 and quoted in minimum increments of 0.0010 RMB per USD=10 RMB.

Embodiments described herein can be combined with embodiments described in the aforementioned commonly-owned application titled "Interest Accrual Provisions for Multi-Laterally Traded Contracts."

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that the steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:
   receiving at a computer data regarding a contract type, the data indicating a designated quantity of a primary currency deliverable under instances of the contract type and also indicating a secondary currency;
   receiving at a computer information regarding availability of the primary currency;
   receiving update information at a computer, the update information indicating a number of outstanding instances of the contract type;
   determining, automatically by a computer and based on an evaluation by the computer of the received information regarding availability of the primary currency and the received update information, that an unavailability condition has occurred with regard to the primary currency; and
   transmitting, from a computer and in response to the determining, a notification authorizing satisfaction of obligations under at least a portion of the outstanding instances with the secondary currency instead of the primary currency, the notification including an exchange rate to be used in calculating an amount of the secondary currency equivalent to the designated quantity of the primary currency.

2. The method of claim 1, wherein the contract type is a type of multi-laterally traded futures contract.

3. The method of claim 2, wherein the type of multi-laterally traded futures contract is a contract requiring delivery of the designated quantity of the primary currency in return for payment of an amount of the secondary currency.

4. The method of claim 2, wherein the type of multi-laterally traded futures contract is a contract requiring delivery of the designated quantity of the primary currency in return for payment of an amount of currency other than the secondary currency.

5. The method of claim 1, wherein receiving data regarding a contract type comprises receiving data regarding multiple types of multi-laterally traded contracts, each of the multiple types designating the primary currency for satisfaction of at least some obligations.

6. The method of claim 5, wherein
   a first subset of the multiple types designates a first secondary currency,
   a second subset of the multiple types designates a second secondary currency, the second secondary currency being different from the first secondary currency, and
   transmitting the notification comprises authorizing satisfaction with the first secondary currency for contract types in the first subset and authorizing satisfaction with the second secondary currency for contract types in the second subset.

7. The method of claim 1, further comprising:
   receiving, after transmitting the notification, data indicating settlement of the at least a portion of the outstanding instances with the secondary currency.

8. The method of claim 1, wherein the information regarding availability of the primary currency comprises an estimated quantity of the primary currency available on a world market, and wherein the determining comprises
   comparing, by the computer, the estimated quantity of the primary currency and a volume of the number of outstanding instances that will become due in a time period, and
   determining, by the computer, that the estimated quantity of the primary currency is less than a predefined multiple of that volume.

9. The method of claim 1, wherein the information regarding availability of the primary currency comprises exchange rates for the primary currency, and wherein the determining comprises
- comparing, by the computer, an average current exchange rate for the primary currency and exchange rates for the primary currency in preceding time periods, and
- determining, by the computer, that the average current exchange rate exceeds, by a predefined amount, a value calculated from one or more preceding time period exchange rates.

10. The method of claim 1, wherein the notification authorizes satisfaction of obligations under a randomly selected subset of the outstanding instances with the secondary currency instead of the primary currency.

11. A non-transitory computer-readable medium storing computer executable instructions that, when executed, cause the computer to perform operations that include:
- receiving data regarding a contract type, the data indicating a designated quantity of a primary currency deliverable under instances of the contract type and also indicating a secondary currency;
- receiving information regarding availability of the primary currency;
- receiving update information indicating a number of outstanding instances of the contract type;
- determining, automatically and based on an evaluation by the computer of the received information regarding availability of the primary currency and the received update information, that an unavailability condition has occurred with regard to the primary currency; and
- transmitting, in response to the determining, a notification authorizing satisfaction of obligation under at least a portion of the outstanding instances with the secondary currency instead of the primary currency, the notification including an exchange rate to be used in calculating an amount of the secondary currency equivalent to the designated quantity of the primary currency.

12. The computer-readable medium of claim 11, wherein the contract type is a type of multi-laterally traded futures contract.

13. The computer-readable medium of claim 12, wherein the type of multi-laterally traded futures contract is a contract requiring delivery of the designated quantity of the primary currency in return for payment of an amount of the secondary currency.

14. The computer-readable medium of claim 12, wherein the type of multi-laterally traded futures contract is a contract requiring delivery of the designated quantity of the primary currency in return for payment of an amount of currency other than the secondary currency.

15. The computer-readable medium of claim 11, wherein receiving data regarding a contract type comprises receiving data regarding multiple types of multi-laterally traded contracts, each of the multiple types designating the primary currency for satisfaction of at least some obligations.

16. The computer-readable medium of claim 15, wherein
- a first subset of the multiple types designates a first secondary currency,
- a second subset of the multiple types designates a second secondary currency, the second secondary currency being different from the first secondary currency, and
- transmitting the notification comprises authorizing satisfaction with the first secondary currency for contract types in the first subset and authorizing satisfaction with the second secondary currency for contract types in the second subset.

17. The computer-readable medium of claim 11, storing further computer executable instructions that, when executed, cause the computer to perform operations that include:
- receiving, after transmitting the notification, data indicating settlement of the at least a portion of the outstanding instances with the secondary currency.

18. The computer-readable medium of claim 11, wherein the information regarding availability of the primary currency comprises an estimated quantity of the primary currency available on a world market, and wherein the determining comprises
- comparing the estimated quantity of the primary currency and a volume of the number of outstanding instances that will become due in a time period, and
- determining that the estimated quantity of the primary currency is less than a predefined multiple of that volume.

19. The computer-readable medium of claim 11, wherein the information regarding availability of the primary currency comprises exchange rates for the primary currency, and wherein the determining comprises
- comparing an average current exchange rate for the primary currency and exchange rates for the primary currency in preceding time periods, and
- determining that the average current exchange rate exceeds, by a predefined amount, a value calculated from one or more preceding time period exchange rates.

20. The computer-readable medium of claim 11, wherein the notification authorizes satisfaction of obligations under a randomly selected subset of the outstanding instances with the secondary currency instead of the primary currency.

* * * * *